(12) United States Patent
Garagashyan

(10) Patent No.: US 10,792,962 B2
(45) Date of Patent: Oct. 6, 2020

(54) ALL-TERRAIN VEHICLE AND ITS SUSPENSION

(71) Applicant: Ensenor Enterprises Limited, Nicosia (CY)

(72) Inventor: Aleksey Garagashyan, Saint Petersburg (RU)

(73) Assignee: Ensenor Enterprises Limited, Nicosia (CY)

(*) Notice: Subject to any disclaimer, the term of this patent is extended or adjusted under 35 U.S.C. 154(b) by 0 days.

(21) Appl. No.: 16/726,926

(22) Filed: Dec. 25, 2019

(65) Prior Publication Data

US 2020/0139773 A1    May 7, 2020

Related U.S. Application Data

(63) Continuation of application No. 14/909,123, filed as application No. PCT/IB2015/056131 on Aug. 12, 2015, now Pat. No. 10,549,588.

(30) Foreign Application Priority Data

Aug. 26, 2014    (RU) ................. 2014135075

(51) Int. Cl.
  *B60C 23/10*    (2006.01)
  *B60C 23/00*    (2006.01)
  (Continued)

(52) U.S. Cl.
  CPC ............ *B60C 23/10* (2013.01); *B60C 23/003* (2013.01); *B60C 23/14* (2013.01); *B60F 3/00* (2013.01);
  (Continued)

(58) Field of Classification Search
  CPC ................. B60C 21/10; B60G 17/04
  See application file for complete search history.

(56) References Cited

U.S. PATENT DOCUMENTS 1,855,101 A    4/1932    Daneel
2,849,047 A    8/1958    Lamont et al.
(Continued)

FOREIGN PATENT DOCUMENTS

CL    2013003319 A1    8/2014
CN    1093658 A    10/1994
(Continued)

OTHER PUBLICATIONS

Aleksey Chuprikov, "Shoe" is not lost (Beadlock), All-Wheel Drive 4×4, Mar. 2004; Russia; http://www.off-road.ru/equipment/beadlock.shtml.
(Continued)

*Primary Examiner* — James A English
(74) *Attorney, Agent, or Firm* — IRL Legal Services, LLC; Ilya R. Lapshin

(57) ABSTRACT

The invention relates to design of all-terrain vehicles. The vehicle comprises a gas line which is connected to all of the wheel tires simultaneously and is coupled to a system for inflating the tires. A suspension comprises a wheel springing system connected to the wheel tires, a pneumatic drive and a system for inflating the tires, wherein the wheel springing system is configured in the form of an gas line formed from the cavities of the pipes from which a frame is welded, or is configured outside the frame, forming a closed loop that is connected to each of the tires by means of pipes with closure members, and wherein the pneumatic drive and the system for inflating the tires are constituted by an engine exhaust system which is provided with a baffle and is coupled to the air line by means of a pipe with a closure member.

18 Claims, 4 Drawing Sheets

(51) Int. Cl.
*B60C 23/14* (2006.01)
*B60F 3/00* (2006.01)
*B60G 17/04* (2006.01)
*B60G 21/06* (2006.01)
*B60H 1/02* (2006.01)
*B62D 11/08* (2006.01)
*F02D 17/02* (2006.01)
*B60J 1/02* (2006.01)
*B60J 1/08* (2006.01)

(52) U.S. Cl.
CPC ............ *B60G 17/04* (2013.01); *B60G 21/06* (2013.01); *B60H 1/02* (2013.01); *B62D 11/08* (2013.01); *B60J 1/02* (2013.01); *B60J 1/08* (2013.01); *F02D 17/023* (2013.01)

(56) References Cited

U.S. PATENT DOCUMENTS

| | | |
|---|---|---|
| 3,718,170 A | 2/1973 | Caron et al. |
| 4,470,506 A | 9/1984 | Goodell et al. |
| 6,389,341 B1 * | 5/2002 | Davis ................ B60G 17/0152 188/266.5 |
| 7,150,457 B2 | 12/2006 | Rautenbach |
| 8,016,345 B1 | 9/2011 | Goddard et al. |
| 9,278,587 B2 | 3/2016 | Honig |
| 2005/0212247 A1 | 9/2005 | Rautenbach |
| 2012/0248813 A1 | 10/2012 | Kitaguchi et al. |
| 2013/0020046 A1 | 1/2013 | Momose et al. |
| 2014/0075973 A1 | 3/2014 | Graaf et al. |

FOREIGN PATENT DOCUMENTS

| | | |
|---|---|---|
| CN | 1232761 A | 10/1999 |
| CN | 2429353 Y | 5/2001 |
| CN | 201367010 Y | 12/2009 |
| DE | 1411934 C1 | 3/1995 |
| DE | 102004033898 A1 | 1/2006 |
| DE | 102012105769 A1 | 4/2014 |
| EP | 1099574 A1 | 5/2001 |
| GB | 1094814 A | 12/1967 |
| JP | H0290104 U | 7/1990 |
| JP | H035606 U | 1/1991 |
| JP | 2006069484 A | 3/2006 |
| RU | 2005630 C1 | 1/1994 |
| RU | 2056301 C1 | 3/1996 |
| RU | 2171189 C2 | 7/2001 |
| RU | 93742 A1 | 5/2010 |
| RU | 100998 U1 | 1/2011 |
| RU | 135969 U1 | 12/2013 |
| SU | 1062024 A1 | 12/1983 |
| UA | 45501 C2 | 4/2002 |
| UA | 56000 A | 4/2003 |

OTHER PUBLICATIONS

WO2016030787 International Search Report and Written Opinion.

* cited by examiner

ALL-TERRAIN VEHICLE AND ITS SUSPENSION

RELATED APPLICATIONS

This application is a continuation of U.S. application Ser. No. 14/909,123, filed Jan. 31, 2016, which was the National Stage of International Application No. PCT/IB2015/056131, filed Aug. 12, 2015, which claims priority to Russian Patent Application No. RU 2014135075, filed Aug. 26, 2014, all of which are incorporated herein by reference in their entirety.

FIELD OF THE INVENTION

The invention relates to the vehicles for off-road driving, both on land and on water, which can be applied for construction of vehicles with good cross-country ability, e.g. all-terrain vehicles (ATVs).

BACKGROUND

A prior art reference, such as patent for utility model RU No. 100998 All-terrain vehicle Kerzhak, knows an all-terrain vehicle with good cross-country ability. The said vehicle comprises a frame with an installed power plant, a gearbox, a cabin, a flat body, the driving axles, the differential gears, and wheel reduction gears connected with low pressure tires. The driving axles are mounted on a trailing arm of spiral spring suspension. The vehicle has a centralized tire inflation system.

The disadvantage of the said technical solution is the presence of the wheels spring suspension which does not provide a ride comfort while driving adverse terrains. Also another prior art reference such as patent for utility model RU No. 93742 All-terrain amphibian, knows an all-terrain amphibious vehicle comprising a hermetically-sealed body, an engine with a transmission, a running gear including a final drive system with the interconnected half-shafts, and a control device.

To reduce specific ground pressure and to improve cross-country ability, the rubber or plastic caterpillar tracks with the side guards (rails) are put on the wheels. The needed stretch is ensured due to the higher pressure (with increased diameter of a wheel). The disadvantage of the said design is that there is a need to use extra means (caterpillar tracks) to improve vehicle's cross-county ability. Also the prior art reference as shown on www.petrovichauto.ru, knows an all-terrain vehicle Petrovich referred as a prototype and comprising a single-space cabin, a transformable passenger compartment, a power drive mounted on a frame, a transmission, a running gear with a wheel reduction gear, the frames, an independent wheel suspension in a form of transverse arms.

The disadvantage of the said design is a use of a wheel levered suspension which does not ensure enough reliability of an ATV while cross-country that can result in its damage due to the shock stress.

Also a prior art reference, such as patent for invention RU No. 2005630, Air suspension with stabilizer, knows an air suspension with stabilizer mounted on a vehicle comprising four spring and guide assemblies equipped with additional pressure rod ends of some greater volume than the rest of them.

The rod end of each assembly is connected with (different) upper chambers (above a piston) of two neighboring assemblies and with rod ends of the most distant assembly though a propulsion nozzle due to diagonal connections between the similar chambers and their cross connections with the different chambers though the connecting ducts. The upper chambers are interconnected with the ducts of greater cross-section than the connecting rod ends. The lower chambers (under a piston) of each assembly are isolated. Working pressure medium in a quiescent state is lower in the lower chambers than in other ones. The disadvantage of the above suspension is the complexity of its design as well as the higher weight of the vehicle in general.

Also another prior art reference, such as U.S. Pat. No. 7,150,457, Suspension system for a vehicle, knows a prototype of suspension system for a vehicle for travelling on any terrain. The said suspension system includes a plurality of fluid-operated cylinders which are each configured to interconnect wheels of the vehicle to the chassis. Fluid flow communication between the fluid-operated cylinders is achieved via tubes which extend between operative upper or lower chambers of fluid-operated cylinders.

The disadvantage of the said technical solution is that this design provides only wheel suspension with a help of tubes due to feedback circuit of a pneumatically pressurized flow control arrangement which distributes air flows between cylinders only within a pair of wheels that does not ensure ride comfort under varying terrain conditions, make design more complicated and increase overall weight of a vehicle. For persons skilled in the art it will be obvious that the mechanical suspensions with leaf springs, coil springs, levers, shock absorbers are mounted on the conventional vehicles as well as on the all-terrain vehicles to suspend wheels and to ensure the smooth drive. The prior art also knows pneumatic suspensions provided with pneumatic cylinders.

Significant disadvantage of these suspensions is their poor reliability under complex terrain conditions due to low shock resistance of running gear, as well as a sufficiently high specific amount of metal per manufactured structure. In addition, a tire inflation system in such embodiments is made in the form of additional devices such as compressors.

BRIEF SUMMARY

The first object of the claimed invention is to create a new reliable, compact, efficient and easy to use multi-purpose vehicle with good cross-country ability (an all-terrain vehicle).

This object is achieved by designing an all-terrain vehicle, comprising: a cabin with glazing and doors; a passenger compartment; a frame; an engine with exhaust system; a transmission gearbox; a steering gear; a running gear comprising a final drive system connected with at least two pairs of axle shafts with the wheels mounted on them having the low pressure tires; a suspension connected with the wheel tires; a tire inflation system; a heating system; a control system.

Whereas according to the claimed invention, an all-terrain vehicle comprises an air line connected simultaneously with all wheel tires and associated with a tire inflation system.

Whereas according to the claimed invention, a cabin frontal glazing is configured to be opened forward and upward and is installed at an angle to the horizontal.

Whereas according to the claimed invention, a door to enter a cabin is located under a frontal glazing and is configured to be less than its width.

Whereas according to the claimed invention, each wheel is mounted on an axle shaft installed within a bearing assembly secured to the frame side members.

Whereas according to the claimed invention, a heating system is configured to remove excess warm air from an engine room into a cabin, a passenger compartment, and in the atmosphere.

Whereas according to the claimed invention, the heat is removed from an engine by means of dampers installed between a cabin and a passenger compartment and in one of the walls of the said passenger compartment.

The second object of the claimed invention is to design a new, reliable in use and easy to manufacture suspension.

This object is achieved by designing an all-terrain vehicle suspension comprising a wheel suspension system connected with the wheel tires, a fluid power drive, and a tire inflation system.

Whereas according to the claimed invention, a wheel suspension system is configured as an air line formed by the hollow tubes welded together to make a frame formed by the side members and the cross bars or it is configured outside a frame to form a closed circuit connected with each tire by means of the pipelines with the valve members. Whereas, as a fluid power drive and a tire inflation system, the claimed invention provides an engine exhaust system equipped with a damper and connected with an air line through a pipeline with a valve member.

Whereas according to the claimed invention, an air line outside a frame is configured as the pipelines connected with each tire through the manifolds with valve members.

Whereas according to the claimed invention, a damper in the engine exhaust system is connected with a control system of an all-terrain vehicle.

The features specified above represent the substance of the claimed invention and ensure the achievement of technical result—to improve ride comfort for an all-terrain vehicle, reduce shock loads on the running gear as well as flexural and resonant oscillations of a vehicle as a whole by means of: pressure changes in the tires by redistributing the air between all the tires simultaneously; control over tire pressure which may decrease or increase while crossing the terrain of varying complexity; reliability improvement of a suspension by reducing the shock loads on a running gear; reduction of specific amount of metal per structure and design simplification of a suspension with a simultaneous decrease in the dimensions of a running gear.

Whereas causal-and-effect relations between the essential features of the invention and achieved technical results are as follows: the proposed tire inflation system allows to maintain automatically the necessary pressure in the tires when it increases or drops providing a smooth ride of a moving all-terrain vehicle.

A frontal glazing of a cabin designed with the ability to open forward and upward and installed at an angle to the horizontal improves a driver's vision, provides ventilation of a cabin in case of a high ambient temperature, thus improving the conditions for the driver and passengers.

Location of a cabin entrance door under a frontal glazing with a smaller width of this door comparing to a frontal glazing contributes to a comfortable position of a driver. Additionally, such door design, as compared with the cabin side doors conventionally used in vehicles of such class, enables not to increase the dimensions of a cabin due to a larger diameter of the vehicle wheels.

Thus, the claimed door arrangement allows reducing the overall dimensions of an all-terrain vehicle that ensures its compactness.

The heating system configured with the ability to remove warm air from an engine into a passenger compartment and in the atmosphere, provides heating of a cabin and a passenger compartment at negative or low ambient temperatures without the installation of special devices (e.g. stoves).

Removal of the excess heat from the engine by means of dampers installed between a cabin and a passenger compartment and in one of the walls of the vehicle body allows to redistribute effectively the flow of warm air from a main radiator, thus providing an energy-efficient heat supply to a cabin and a passenger compartment of the claimed all-terrain vehicle.

A wheel suspension system, configured inside a frame as an air line in the side members and the cross bars of a frame or outside a frame by forming a closed circuit connected with each tire by means of pipelines with mounted valve members, allows: to create a simultaneous pneumatic circulation between all the wheel tires; to disconnect immediately a damaged tire from an air line; to provide wheel springing while cross-country driving under various terrain conditions; to reduce the shock loads for a suspension and therefore to improve significantly its reliability; to reduce a specific amount of metal per structure and dimensions for a running gear and to simplify its design.

The use of an engine exhaust system, as a source for a fluid power drive and tire inflation, is energy efficient because it does not require the installation of additional equipment such as a compressor. Furthermore, the production of the engine exhaust gases is higher comparing to the mechanical or electrical compressors usually used for this purpose.

A damper, which is mounted in the exhaust system of an engine, may be used to slow down an engine or for its emergency stop.

An air line, connected through a pipeline having a valve member with an engine exhaust system equipped with a damper, on the one hand allows to perform automatic inflation of the tires with exhaust gases when the pressure in the tires is decreased and on the other hand to reduce it in case of high pressure, i.e. to release a part of the air from the air line through the exhaust system into the atmosphere.

An air line configured outside the frame in the form of the pipelines connected with each tire through the manifolds with the valve members allows expanding the technological capabilities of a suspension.

BRIEF DESCRIPTION OF THE SEVERAL VIEWS OF THE DRAWINGS

A technical character of the invention is explained with a help of the following figures.

DETAILED DESCRIPTION

Figure 1:
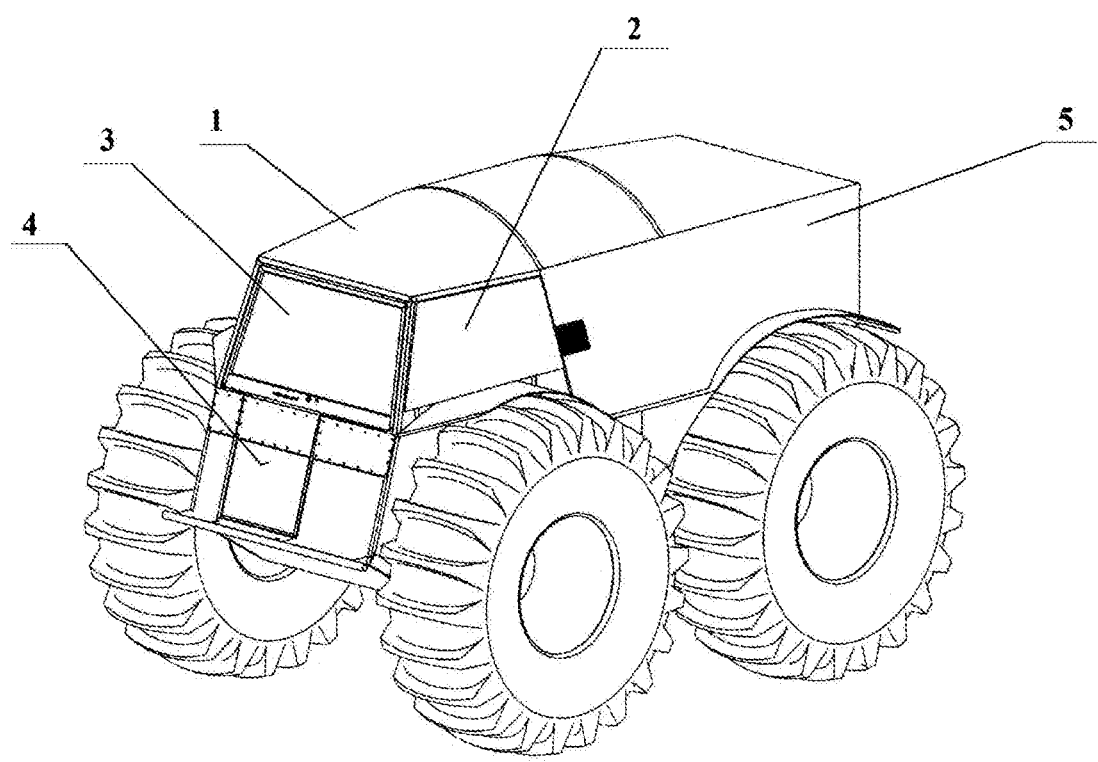
FIG. 1 is general view of an all-terrain vehicle.

The numbers on the above figures refer to: a cabin (1) with a side glazing (2) and a frontal glazing (3), a door (4), a passengers compartment (5); an engine (6); a transmission gearbox (7); a driveline shun (8); a steering gear (9) comprising the axle shafts (25) with the star wheels (26) interconnected by the chain-drives (27) with the star wheels (28), mounted on the axle shafts (12) connected with wheels (14); the final drives (10, 11); the axle shafts (12) fixed within the bearing units (13); the wheels (14) with the low pressure tires (15), mounted on the axle shafts (12); a suspension with an air line (16) configured inside a frame formed by the side members (17) and the cross bars (18); the pipelines (19) with the valve members, e.g. the stop valves (20) connecting an air line (16) with the tires (15); a tire inflation system in a form of a pipeline (21) with a valve member, e.g. a stop valve (22); a damper (23) connected to a pipeline (21) and an air line (16); an exhaust system (24) of an engine (6); an air line configured outside a frame in a form of a pipeline (29) with the manifolds (30) and the valve members such as the valves (31); a clutch (32).

Figure 2:
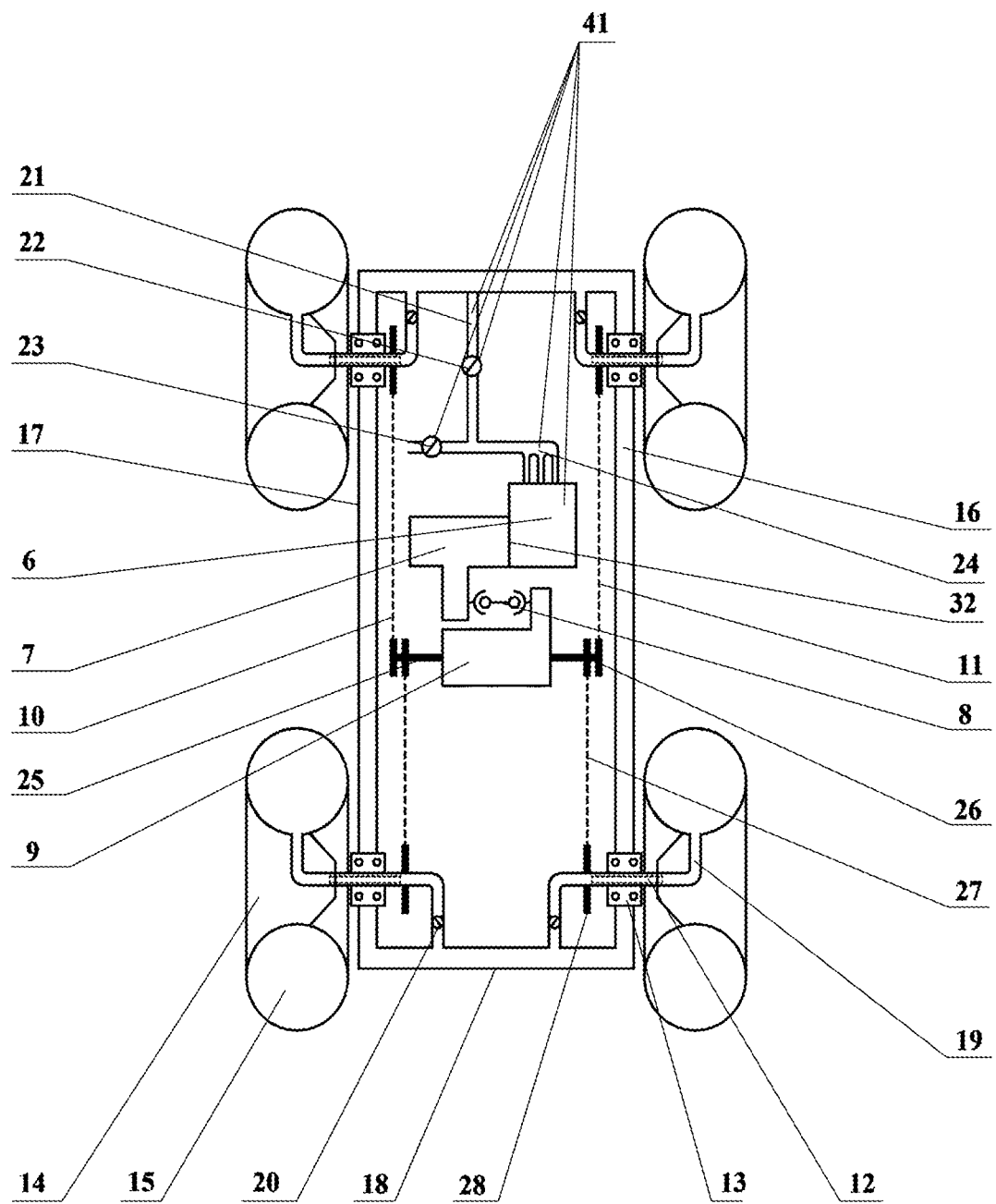
FIG. 2 is layout of main assemblies of an all-terrain vehicle.
Figure 3:
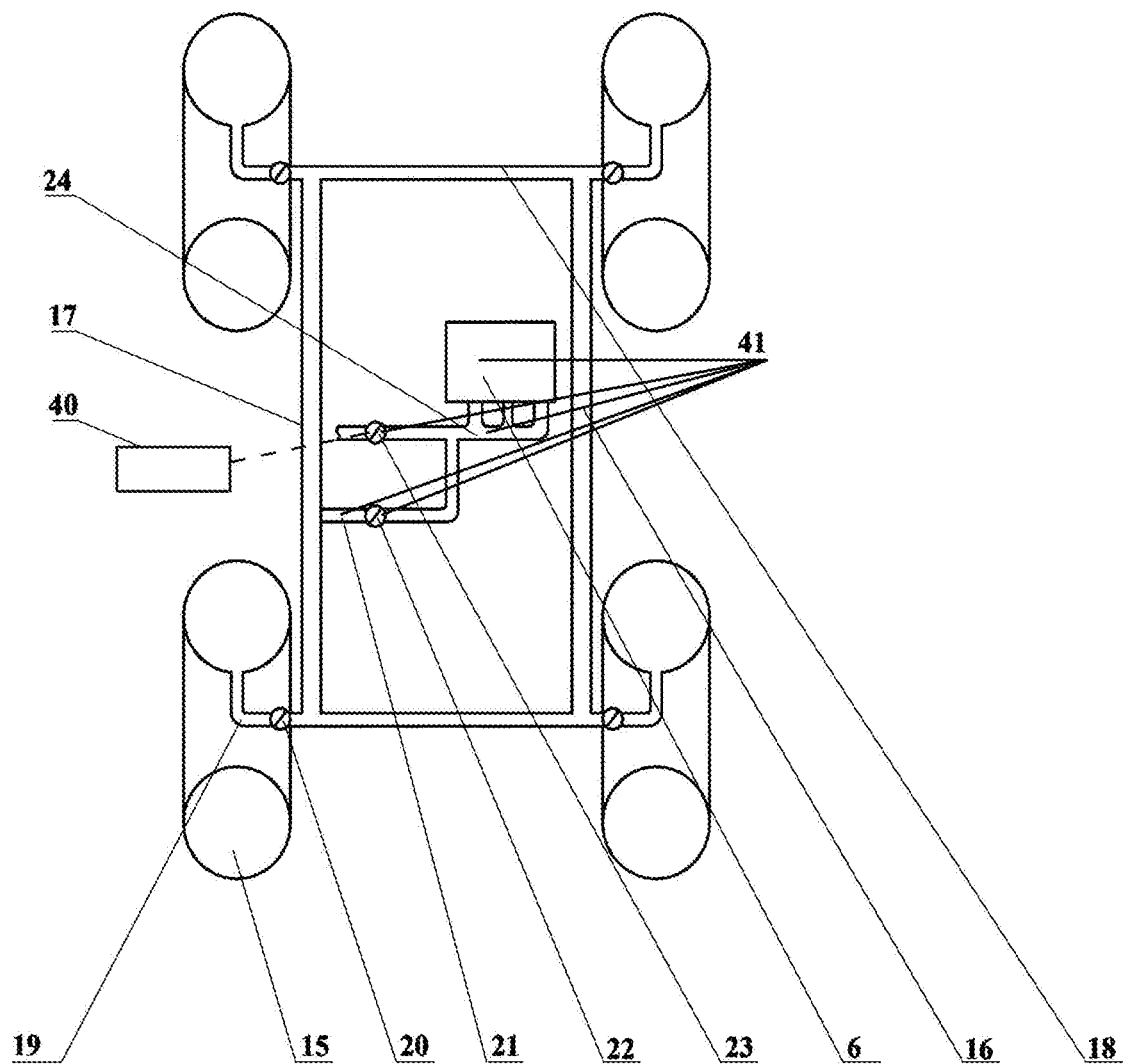
FIG. 3 is schematic layout of an all-terrain vehicle's suspension with an air line in the side members and the cross bars of a frame.

The claimed all-terrain vehicle with its suspension operates in a following way. When an engine (6) is turned, the valve members (20) on the pipelines (19) of an air line (16) as well as a valve member (22) on a pipeline (21) are opened and a damper (23) in an exhaust system (24) is closed. In result of excessive pressure in an exhaust system (24) exhaust gases flow through an open valve (22) and a pipeline (16) into the tires (15). All tires (15) are pumped up simultaneously to the required level of pressure depending on the terrain on which an all-terrain vehicle will move. The pressure level in tires (15) is regulated by a pressure gauge installed on an all-terrain vehicle's control panel, i.e. a control system shown at (40) in FIGS. 3 and 4, and a fluid power drive shown at (41) in FIGS. 2-4.

After a valve (22) is closed automatically and a damper (23) is opened an all-terrain vehicle start to move. At the same time the pressure in tires (15) is maintained at the constant level because a valve (22) is closed and an air line with the wheels is disconnected from an exhaust system. The running torque is transferred from an engine (6) to a clutch (32), then to a transmission gearbox (7), and then, via driveline shun (8), to a steering gear that distributes it between right and left sides of an all-terrain vehicle changing from the full-stop position to a full-on position.

A steering gear operates in a following way. To make a turn, a driver must pull one of the levers. In this case a clutch from the relevant side is unlocked first and the brakes are locked after. The more one pushes a brake level, the more the brakes are locked. To stop an all-terrain vehicle a driver must put both levels into pull on position. With the lower pressure in tires (15), a damper (23) is closed manually or automatically, and a valve (22) for inflation of the tires with exhaust gases is opened. The operation herein can be performed both in manual and automatic modes.

To decrease the pressure in the tires (15), e.g. when one need to force a water course, the valve (22) is opened manually and an air from an air line (16) is released into the atmosphere through a damper (23) of an exhaust system (24).

Figure 4:
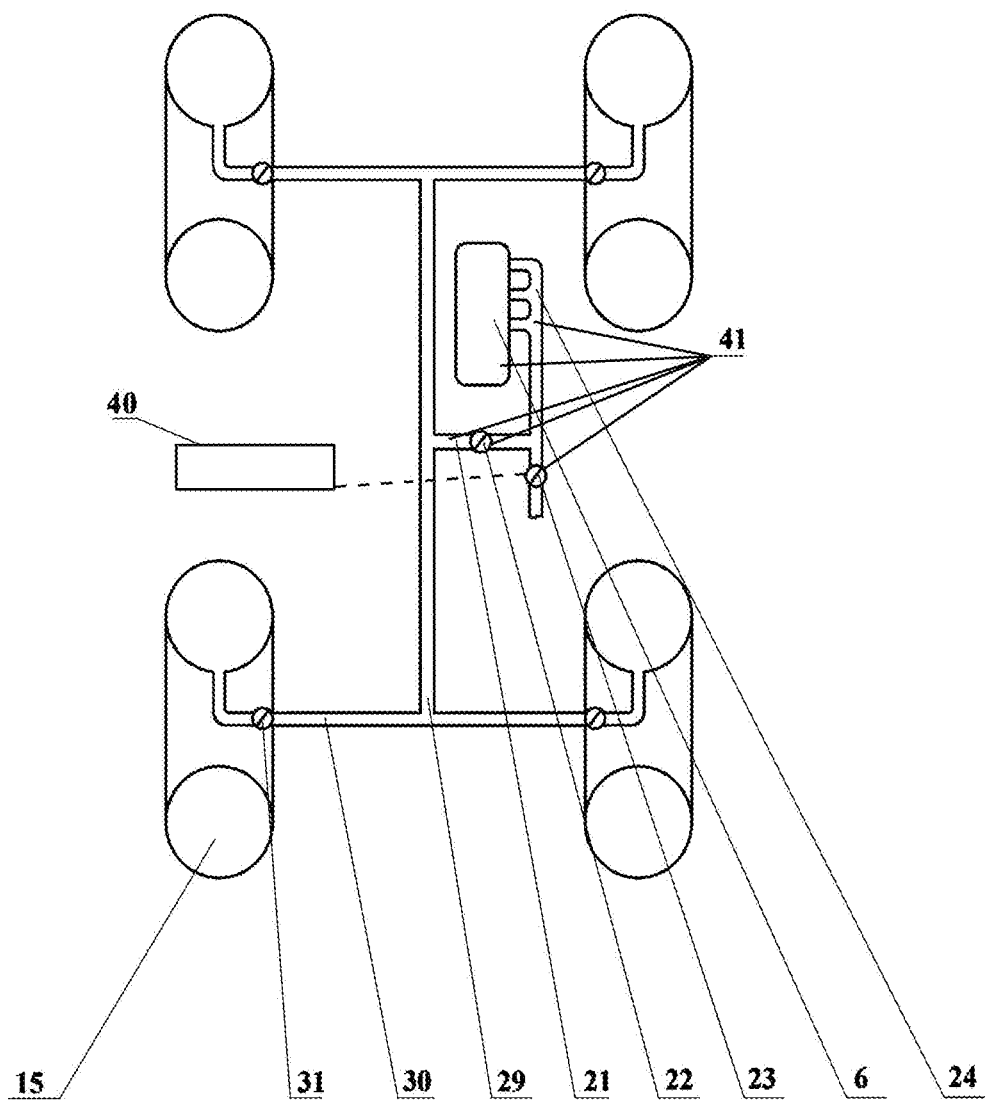
FIG. 4 is schematic layout of a suspension with an air line provided outside a frame.

In other embodiment of a suspension the air line is configured outside the frame as a pipeline (29) with manifolds (30) and valve members (31) (see FIG. 4). The operation of an all-terrain vehicle with a suspension according to this embodiment is performed in a similar way to the previous embodiment of the invention.

Hence, the claimed all-terrain vehicle and its suspension provide ride comfort, reduce the shock loads for a running gear during cross-country riding, ensure reliability eliminating flexural and resonant oscillations of the vehicle as a whole.

While this invention has been particularly shown and described with references to preferred embodiments thereof, it will be understood by those skilled in the art that various changes in form and details may be made therein without departing from the scope of the invention encompassed by the appended claims.

The invention claimed is:
1. A vehicle suspension comprising:
  wheels, each wheel comprising a tire and a shaft,
    wherein the tires are in direct fluid communication with each other via a pipeline;
  bearing units, each bearing unit accommodating one of the shafts; and
  a rigid suspension frame rigidly attached to the bearing units and rigidly attached to a vehicle body.
2. The suspension of claim 1,
  wherein the frame comprises the pipeline.
3. The suspension of claim 2,
  wherein the pipeline comprises at least one tube; and
  wherein the at least one tube forms at least a part of the frame.
4. The suspension of claim 3,
  wherein the pipeline comprises tubes; and
  wherein the tubes form the frame.
5. The suspension of claim 1,
  wherein the pipeline is a closed-circuit pipeline.
6. The suspension of claim 1,
  wherein the pipeline comprises at least one tube in direct fluid communication with one of the tires;
  wherein the at least one tube comprises a valve.
7. The suspension of claim 6, wherein the valve is connected to a vehicle control system.
8. The suspension of claim 1, wherein the pipeline is connected to a pressurized gas source.
9. The suspension of claim 8, wherein the gas source is a vehicle exhaust.
10. The suspension of claim 8, wherein the pipeline is connected to the pressurized gas source through a damper.
11. The suspension of claim 10, wherein the damper is connected to a vehicle control system.
12. The suspension of claim 1, further comprising an exhaust damper between the pipeline and the outside air.
13. The suspension of claim 12, wherein the exhaust damper is connected to a vehicle control system.
14. The suspension of claim 1, wherein the vehicle is an all-terrain vehicle.
15. The suspension of claim 1, wherein the tires are low-pressure tires.
16. A vehicle comprising the vehicle suspension of claim 1.
17. The vehicle of claim 16, wherein the vehicle suspension is the only suspension system of the vehicle.
18. The vehicle of claim 16, wherein the vehicle is an all-terrain vehicle.

* * * * *